United States Patent
Jung

(10) Patent No.: US 7,782,768 B2
(45) Date of Patent: Aug. 24, 2010

(54) WIRELESS NETWORK APPARATUS AND METHOD FOR CONTROLLING TRANSMISSION RATE USING THE SAME

(75) Inventor: Jae-gyu Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 922 days.

(21) Appl. No.: 11/227,498

(22) Filed: Sep. 16, 2005

(65) Prior Publication Data

US 2007/0064596 A1 Mar. 22, 2007

(51) Int. Cl.
*G06F 11/00* (2006.01)
(52) U.S. Cl. .................... 370/229; 370/351; 370/310.1; 370/338
(58) Field of Classification Search ................. 370/229, 370/351, 310.1, 338
See application file for complete search history.

(56) References Cited

U.S. PATENT DOCUMENTS

| | | | |
|---|---|---|---|
| 5,761,254 A * | 6/1998 | Behrin | 375/355 |
| 6,445,707 B1 * | 9/2002 | Iuoras et al. | 370/395.43 |
| 6,574,200 B1 * | 6/2003 | Tsumura | 370/311 |
| 6,646,987 B1 | 11/2003 | Qaddoura | |
| 7,035,220 B1 * | 4/2006 | Simcoe | 370/236 |
| 2007/0280115 A1 * | 12/2007 | Meyer et al. | 370/236 |

FOREIGN PATENT DOCUMENTS

| | | |
|---|---|---|
| JP | 2004-032218 A | 1/2004 |
| KR | 10-0365788 B1 | 3/2002 |
| KR | 10-2004-0021794 A | 3/2004 |
| KR | 2004-0022780 A | 3/2004 |

* cited by examiner

*Primary Examiner*—Patrick N Edouard
*Assistant Examiner*—Aung Win
(74) *Attorney, Agent, or Firm*—Sughrue Mion, PLLC

(57) ABSTRACT

A wireless network apparatus and a method for controlling the transmission rate of the same, whereby a receiver side is capable of constantly maintaining the full transmission rate by coordinating the maximum number of packets to be sent to the network from a sender side. Further, a wireless network apparatus including a time interval calculating unit to calculate the time intervals of received packets, a receiving mode determining unit to determine a receiving mode to receive packets according to the calculated time intervals, a packet determining unit to calculate a period during which the determined receiving mode is maintained, and a maximum packet determining unit to determine the maximum number of packets which can be sent to the network by a device, according to the number of packets consecutively received during the calculated period.

18 Claims, 7 Drawing Sheets

WIRELESS NETWORK APPARATUS AND METHOD FOR CONTROLLING TRANSMISSION RATE USING THE SAME

BACKGROUND OF THE INVENTION

1. Field of the Invention

Apparatuses and methods consistent with the present invention relate to the measurement of wireless network apparatuses, and control of the transmission rate using the same. More particularly, the present invention relates to a wireless network apparatus and a method for controlling the transmission rate using the same, whereby a receiver side is capable of constantly maintaining the maximum transmission rate by coordinating the maximum number of packets to be sent to the network from a sender side.

2. Description of the Related Art

As illustrated in FIG. 1, a wireless network apparatus according to a conventional art comprises a packet sending device 10 to send a packet, and a packet receiving device 20 to receive the sent packet and send a response packet to the packet sending device 10 depending upon whether there are any errors in the received packet.

The packet sending device 10 comprises a packet sending unit 11 to send a packet to the packet receiving device 20, a response packet receiving unit 12 to receive a response packet, and a packet determining unit 13 to determine a packet to be sent according to the received response packet.

The packet receiving device 20 comprises a packet receiving unit 21 to receive a packet, a packet error detecting unit 22 to detect an error in the received packet, a response packet generating unit 23 to generate a response (packet) to the received packet, a response packet sending unit 24 to send the generated response packet to the packet sending device 10, a data extracting unit 25 to extract user data from the received packet, and a data transferring unit 26 to transfer the extracted user data to an application program.

When no errors are detected, the packet error detecting unit 22 sends the received packet to the data extracting unit 25. If an error is detected, the packet error detecting unit 22 disregards the received packet.

Depending on the available buffer space, in which the received packets are buffered, the response packet generating unit 23 sets the maximum number of packets to be sent to the network from the packet sending device 10, and generates a response packet including the set maximum number of packets, the sequence numbers of the packets received to date, and the sequence numbers of the packets to be received in the future.

Accordingly, the packet sending device 10 determines the maximum number of packets that can be sent to the network, based on a response packet, and continuously sends the packets based on a predetermined transmission rate, and under the limits of the determined maximum number of packets.

Operations of the conventional wireless network apparatus described above will be described with reference to FIG. 2.

The packet receiving unit 21 receives a packet sent from the packet sending device 10 S10.

The packet error detecting unit 22 determines whether there are any errors in the received packet S20.

The packet error detecting unit 22 determines whether there are any errors in the received packet through a checksum field of the received packet.

When it is determined that the packet has no errors, the received packet is sent to the data extracting unit 24, which extracts the user data S30. The extracted user data is transferred to an application program by the data transferring unit 26 S40.

However, when the packet error detecting unit 22 detects an error, the received packet is disregarded S50.

Thereafter, the response packet generating unit 23 generates a response packet to inform that there is an error in the received packet, and to include the sequence numbers of the packets received to date and the sequence numbers of the packets to be received in the future S60.

The maximum number of packets is determined by the buffer size of the packet receiving device 10 and this number is included in the response packet, which is used by the packet sending device 10. The generated response packet is sent to the packet sending device 10 through the response packet sending unit 24 S70.

The packet sending device 20 sends packets under the limits so as not to exceed the maximum number of packets, and determines packets to be sent based on the sequence number included in the response packet.

In the wireless network apparatus as described above, a considerable number of packets are buffered in a buffer of a middle node, such as a base station, which connects a wired section and a wireless section.

In other words, when the packet sending device 10 is connected to the middle node by a wire, and the middle node and the packet receiving device 20 are connected wirelessly, the transmission rate of the wireless section would be lower than that of the wired section.

Thus, in view of the time that packets sent to the middle node from the packet sending device 10 are buffered in the middle node, the number of packets sent to the packet receiving device 20 from the middle node must be small. As such, a backlog occurs in the buffer of the base station.

When the packet receiving device 20 described above receives packets from a packet sending devices, packets sent from other packet sending devices cannot be received until the packet receiving device 20 receives all the packets sent from a predetermined packet sending device via the buffer of the base station. Therefore, when no response (packet) to the sent packets is received, the packet sending device may re-send packets through a time-out process.

For this reason, the transmission rate of the packet sending device having later sent packets would be sharply lowered, in comparison of the packet sending device having earlier sent packets.

When a predetermined packet sending device suspends transmission of packets in the course of sending them, the packets already sent are buffered in the base station, thereby causing the problem that other devices cannot send packets.

Japanese Unexamined Patent Publication No. 2004-032218 discloses a communication device base station and a mobile communication terminal capable of preventing a reduction in transmission rate due to packet loss in a wireless link, by maintaining a transmission rate that uses the full estimated bandwidth, rather than by allowing a conventional TCP (transmission control protocol) to halve the transmission rate by allowing packet loss using the available bandwidth estimation (ABE). However, this invention still requires changes in the TCP of all the servers including a sender side and a base station. In other words, when it operates like TCP-Reno, the bandwidth is taken away by TCP-Reno, or it is not applicable although TCP-Vegas, TCP-Westwood, etc. are implemented.

SUMMARY OF THE INVENTION

An object of the present invention is to provide a wireless network apparatus and a method for controlling the transmission rate using the same, whereby a receiver side is capable of constantly maintaining the entire transmission rate by coordinating the maximum number of packets to be sent to the network from a sender side.

Another object of the present invention is to provide a wireless network apparatus and a method for controlling the transmission rate using the same, wherein the packet sending devices can respectively have the equal transmission rate although a multiplicity of packet sending devices send packets, by reducing the packets buffered in the middle node as minimum as possible.

The present invention will not be limited to the technical objects described above. Other objects not described herein will be more definitely comprehended by those in the art from the following detailed description.

According to an aspect of the present invention, there is provided a wireless network apparatus including a time interval calculating unit to calculate time intervals of received packets, a receiving mode determining unit to determine a receiving mode to receive packets according to the current time intervals, a packet determining unit to calculate a period during which the determined receiving mode is maintained, and a maximum packet determining unit to determine the maximum number of packets which can be sent to the network by a device to send packets, according to the number of packets consecutively received during the calculated period.

According to another aspect of the present invention, there is provided a wireless network apparatus including a packet sending unit to send a packet, a response packet receiving unit to receive a response packet from a device to receive the sent packet, and a packet determining unit to determine the number of packets to be sent, according to the maximum number of packets included in the response packet.

According to still another aspect of the present invention, there is provided a method for controlling transmission rate using a wireless network apparatus including calculating time intervals of received packets, determining a receiving mode to receive packets according to the current time intervals, calculating a period during which the determined receiving mode is maintained, and determining the maximum number of packets which can be sent to the network by a device to send packets, according to the number of packets consecutively received during the calculated period.

According to yet aspect of the present invention, there is provided a method for controlling transmission rate using a wireless network apparatus including sending a packet, receiving a response packet from a device to receive the sent packet, and determining the number of packets to be sent, according to the maximum number of packets included in the response packet.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS

Figure 1:
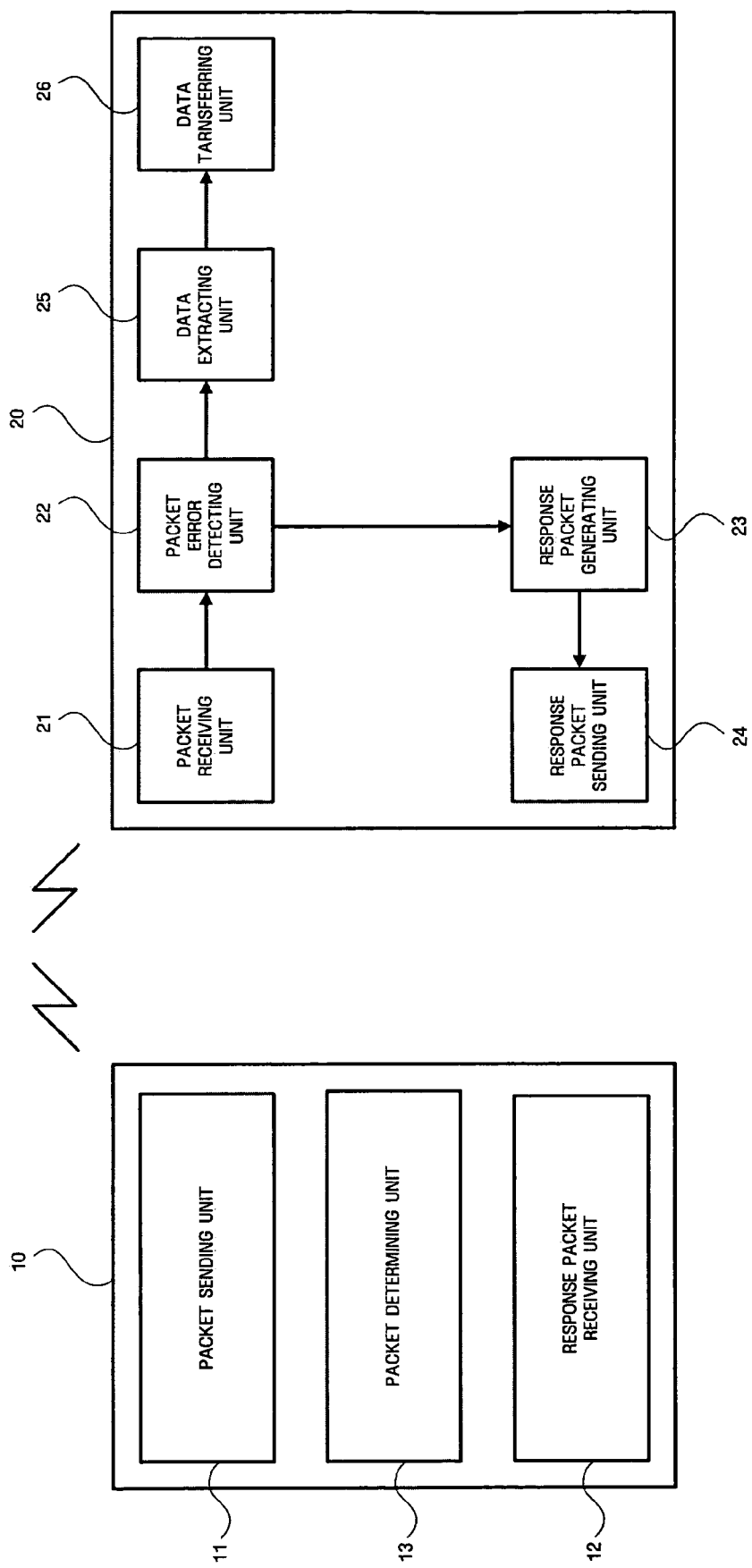
FIG. 1 illustrates a wireless network apparatus according to the conventional art.
Figure 2:
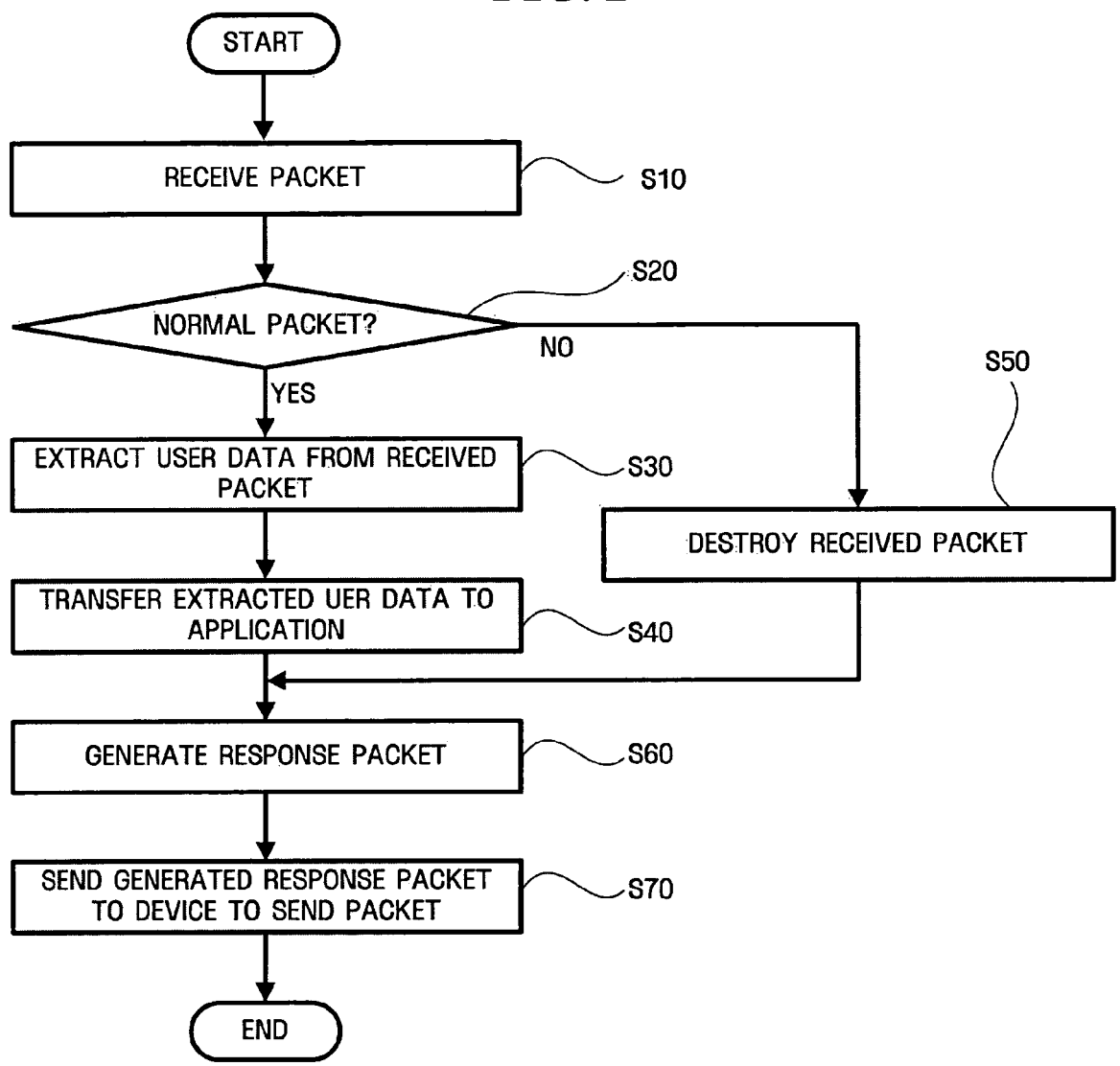
FIG. 2 illustrates a packet transmission method of a wireless network apparatus according to the conventional art.

Subject matter of exemplary embodiments will be covered by the detailed description and drawings of the present invention.

Advantages and features of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Hereinafter, exemplary embodiments of the present invention will be described in more detail with reference to the accompanying drawings.

Figure 3:
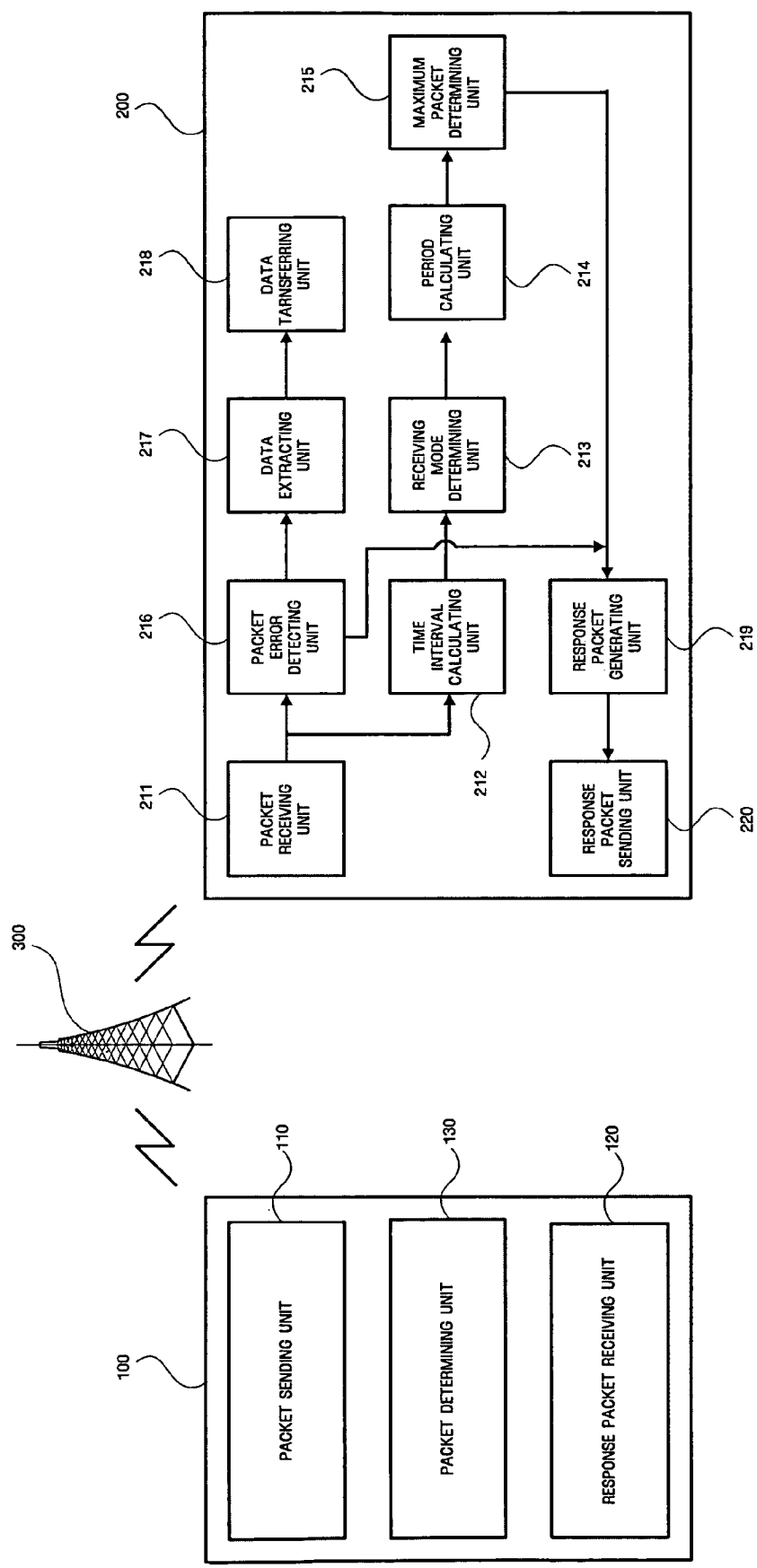
FIG. 3 illustrates a wireless network apparatus according to an exemplary embodiment of the present invention.

As illustrated in FIG. 3, a wireless network apparatus according to an exemplary embodiment of the present invention comprises a packet sending device 100 to send a packet, and a packet receiving device 200 to receive the sent packet and to send a response packet including the maximum number of packets which cap be sent to the network by the packet sending device 100 according to a time interval of the received packets.

The packet sending device 100 receives the response packet from the packet receiving device 200, and can determine the number of packets to be sent in the future based on the maximum number of packets included in the received response packet.

The packet sending device 100 comprises a packet sending unit 110 to send a packet, a response packet receiving unit 120 to receive a response packet from the packet receiving device 200, and a packet determining unit 130 to determine the number of packets to be sent in the future according to the maximum number of packets included in the response packet.

The packet receiving device 200 comprises a packet receiving unit 211 to receive a packet, a time interval calculating unit 212 to calculate a time interval during which packets are received, a receiving mode determining unit 213 to determine a receiving mode to receive packets according to the current time interval, a period calculating unit 214 to calculate a period during which the determined receiving mode is maintained, a maximum packet determining unit 215 to determine the maximum number of packets to be sent to the network by the packet sending device 100 according to the number of packets received during the calculated period.

In an exemplary embodiment of the present invention, it may be understood that a time interval calculated by the time interval calculating unit 212 refers to a time interval between two packets consecutively received.

Further, the maximum number of packets to be transmitted over the network during the maintenance period calculated by the period calculating unit 214 to be described later may be determined based on a receiving mode determined by the receiving mode determining unit 213.

The packet receiving device 200 may further comprise a packet error detecting unit 216 to detect any errors in the received packet, a data extracting unit 217 to extract user data from the received packet, a data transferring unit 218 to transfer the extracted user data to a predetermined application program, a response packet generating unit 219 to generate a response (packet) to the received packet, and a response packet sending unit 220 to send the generated response packet to the packet sending device 100.

The receiving mode determining unit 213 determines the receiving mode of the current time interval. By way of example, this exemplary embodiment will be described with respect to a first receiving mode having a first time interval and a second receiving mode having a second time interval.

It should be noted that a packet is sent from a buffer of the middle node 300 before the first time interval expires, and the packet is sent from the packet sending device 100 before the second time interval expires.

The period calculating unit 214 calculates the period of the receiving mode that is determined by the receiving mode determining unit 213. This period may be obtained by taking the difference between the average time intervals (using the previous average time intervals) and the current time intervals, calculated by the time interval calculating unit 212, of the received packets.

An average time interval may be obtained based on the previous average time interval and the current time interval using Equation 1.

$$TA = a*TO + b*TN \quad (1)$$

where TA refers to the average time interval, $T_O$ refers to the previous average time interval, and $T_N$ refers to the current time interval.

In addition, a and b refer, respectively, to the weights allotted to the previous average time interval and the current time interval, and they obey the relation: a+b=1.

For reference, "a" is larger than "b", which prevents a rapid change of the average time interval due to the current time interval, thereby obtaining a stable average time interval.

The period calculating unit 214 uses Equation 2 to obtain average difference values between average time intervals obtained to date based on the average time interval and using Equation 1.

$$VN = c*VO + d*TA \quad (2)$$

Here, VN refers to an average difference value between average time intervals, VO refers to a previous average difference value, and TA refers to an average time interval obtained using Equation 1.

In addition, c and d refer, respectively, to the weights allotted to the previous average time interval and the current time interval used in obtaining the difference value, and they obey the relation: c+d=1.

For reference, c is larger than d, which prevents rapid change of the average time interval due to the current time interval, thereby obtaining a stable average time interval.

The period calculating unit 214 can calculate a period for maintaining a receiving mode, which is determined based on the values obtained using Equations 1 and 2.

The period can be obtained using Equation 3:

$$T_M = [0, T_A + V_N] \quad (3)$$

where $T_M$ refers to a period during which the determined receiving mode is maintained, $T_A$ refers to an average time interval, and $V_N$ refers to an average difference between average time intervals.

In Equation 3, the period lasts from 0 to TA+VN, and the maximum packet determining unit 215 determines the maximum number of packets which can be sent to the network from the packet sending device, based on the number of packets received consecutively during the calculated period.

The maximum number of packets, determined by the maximum packet determining unit 215, is calculated using α and β, which are obtained by Equation 4:

$$\alpha = \beta/2, \beta = T_{A2}/T_{A1} \quad (4)$$

where $T_{A2}$ refers to an average time interval based on the first receiving mode, and $T_{A1}$ refers to an average time interval based on the second receiving mode.

The maximum packet determining unit 215 increases the maximum number of packets when the number of packets received during the period is less than α, and it decreases the maximum number of packets when the number of packets received during the period is more than β, and it maintains the current maximum number of packets when the number of packets is between α and β.

For example, when the current maximum number of packets is 10, α is 3, and β is 6 the maximum packet determining unit 215 increases the maximum number of packets by 11 if three or less packets are received during the period, it decreases it by 9 if six packets are received during the period, and it maintains the maximum number of packets (10) if five packets are received during the period.

Here, α and β may vary according to the network environment.

The maximum number of packets determined by the maximum packet determining unit 215 is included in the response packet generated by the response packet generating unit 219, and sent to the packet sending device 100 through the response packet sending unit 220.

The packet sending device having received the response packet through the response packet receiving unit 120 may determine the number of packets to be sent in the future according to the maximum number of packets included in the response packet by the packet determining unit 130.

For example, if one response packet is received while the previous maximum number of packets is 10, this implies that transmission of one packet is complete. Thus, the total number of packets sent from the packet sending device 100 is 9.

At this time, if the maximum number of packets included in the response packet is 11, the packet sending device 100 may send two packets.

If the maximum number of packets included in the response packet is 9, the packet sending device 100 sends no packets and is on standby.

In addition, if the maximum number of packets included in the response packet is 10, the packet sending device 100 may send one packet.

As described above, the wireless network apparatus according to an exemplary embodiment of the present invention is capable of preventing over-flow in a buffer of the middle node 300, and it can ensure each packet sending device gets an equal transmission rate by coordinating the number of packets to be sent to the network from each packet sending device, based on the maximum number of packets included in the response packet sent to each packet sending device when packets are received from one or more packet sending devices.

A method for controlling the transmission rate using the wireless network apparatus according to an exemplary embodiment of the present invention will be described.

Figure 4:
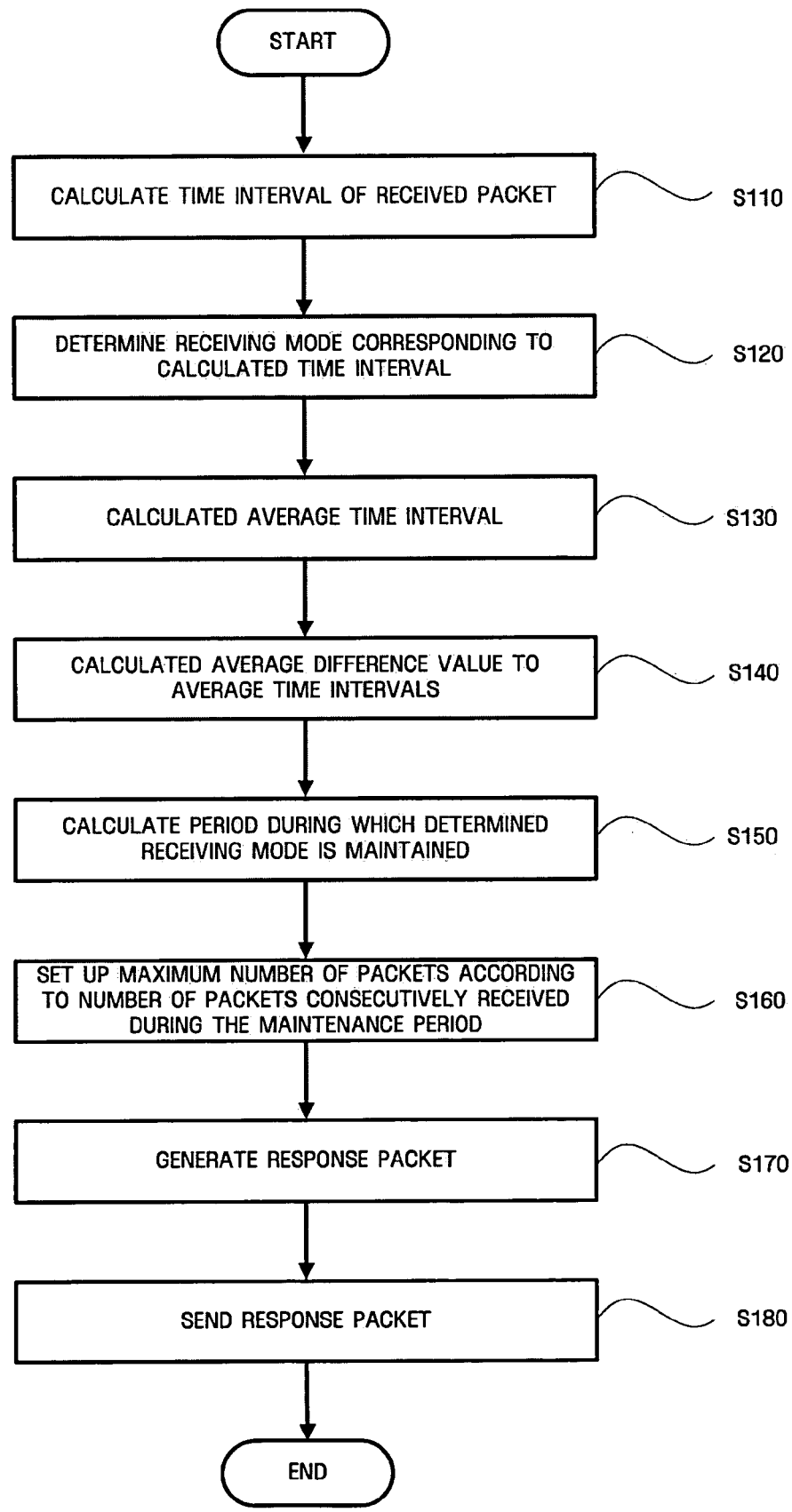
FIG. 4 illustrates a method for controlling the transmission rate of packets in a wireless network apparatus according to an exemplary embodiment of the present invention.

Referring to FIG. 4, when a packet is received by the packet receiving unit 211, the time interval calculating unit 212 calculates a time interval of the received packet S110.

The receiving mode determining unit 213 determines a receiving mode corresponding to the current time interval of the received packet calculated by the time interval calculating unit S120.

The period calculating unit 214 calculates the current average time interval based on the current time interval and the previous average time interval S130.

The average time interval may be obtained using Equation 1, and all of the receiving modes may be obtained in the same manner.

The period calculating unit 214 also calculates the average difference between the average time intervals up to date, using the calculated average time interval.

Here, the calculated difference value may be obtained using Equation 2, which refers to an average of the differences between average time intervals up to date from when the packet has been received.

When the average difference values are calculated, the period calculating unit 214 calculates a period during which a determined receiving mode is maintained using Equation 3 S150.

When the period during which the determined receiving mode is maintained is calculated, the maximum packet determining unit 215 determines the maximum number of packets which can be sent to the network from the packet sending device 100 according to the number of packets consecutively received during the period S160.

Thereafter, the response packet generating unit 219 generates a response packet to be sent to the packet sending device 100 by including the determined maximum number of packets S170.

The generated response packet is sent to the packet sending device that sent the packet, through the response packet sending unit 220 S180.

Figure 5:
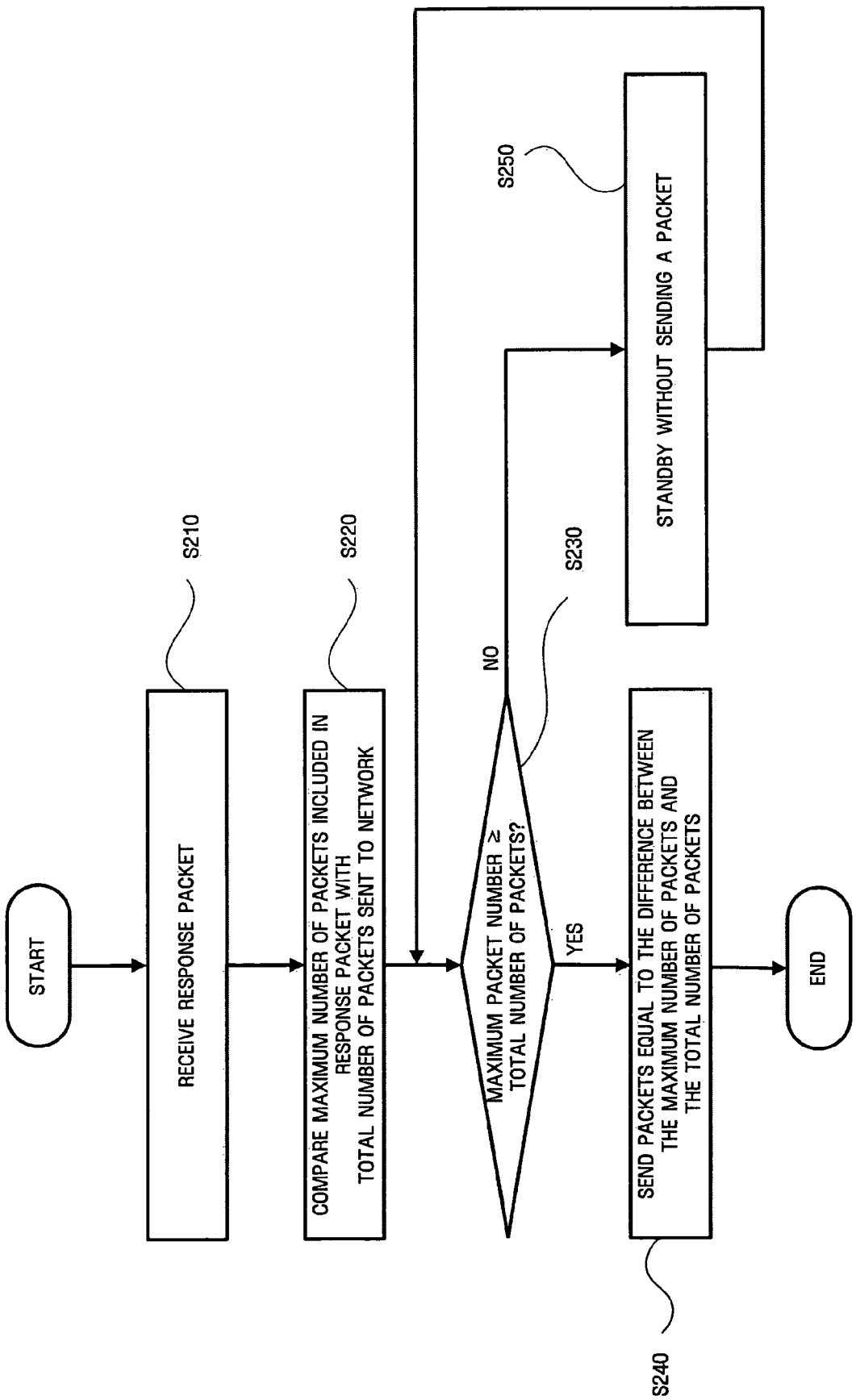
FIG. 5 illustrates a method for coordinating the number of packets transmitted based on response packets in a wireless network apparatus according to an exemplary embodiment of the present invention.

FIG. 5 illustrates a method of coordinating the number of packets to be sent by the packet sending device 100 having received the response packet sent by the response packet sending unit 220, according to the maximum number of packets included in the response packet.

As illustrated, the response packet receiving unit 130 receives the response packet S210, and the packet determining unit 120 reads out the maximum number of packets included in the received response packet, and compares the read maximum number of packets to the total number of packets sent to the network to date S220.

As a result of the comparison, if the maximum number of packets is greater than or equal to the total number of packets S230, packets equal to the difference between the maximum number of packets and the total number of packets are sent through the packet sending unit 110 S240.

If the maximum number of packets is smaller than the total packet number, the packet sending device 100 sends no packets and is on standby S250.

At this time, the packet sending device 100 may be continuously on standby without sending a packet until the maximum number of packets is greater than or equal to the total number of packets.

Changes in the transmission rate according to the method for controlling transmission rate according to an exemplary embodiment of the present invention will be described in more detail.

Figure 6:
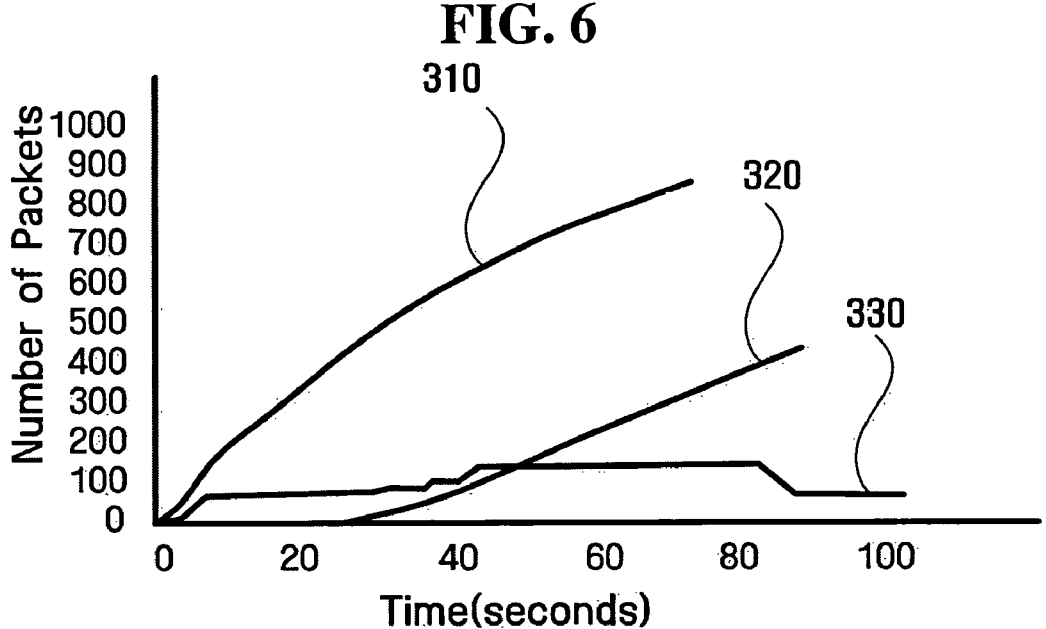
FIG. 6 illustrates the transmission rate of each of two packet sending devices when the transmission rate control method according to an exemplary embodiment of the present invention is not applied.

It can be seen in FIG. 6 that when packets are received from two packet sending devices the packet transmission rate 320 of the second packet sending device is conspicuously lower than the packet transmission rate 310 of the first packet that uses a buffer of a middle node (according to the conventional art).

This is because that the packet from the second packet sending device is sent after packet transmission of the first packet sending device is complete.

The number 330 of the packets buffered in the buffer of the middle node increases as the number of the packet sending devices increases.

Figure 7:
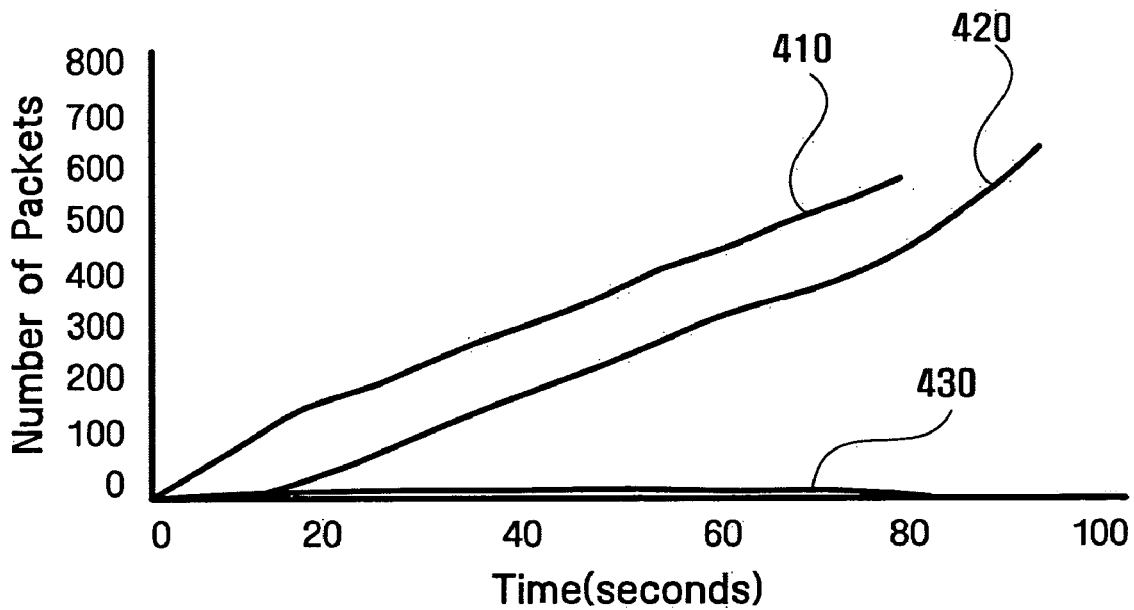
FIG. 7 illustrates the transmission rate of each of two packet sending devices when the transmission rate control method according to an exemplary embodiment of the present invention is applied.

As illustrated in FIG. 7, according to the exemplary embodiment of the present invention the packet transmission rate 410 of the first packet sending device and the packet transmission rate 420 of the second packet sending device are similar.

Additionally, when the exemplary embodiment of the present invention is used, the minimum number 430 of packets buffered in the buffer of the middle node 300 is maintained.

Figure 8:
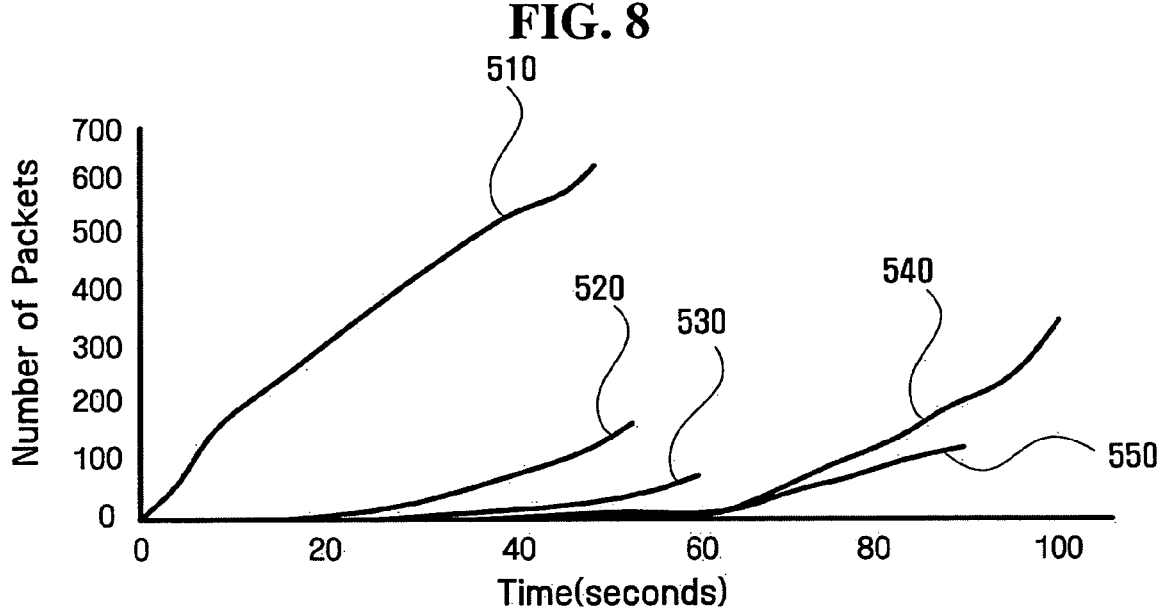
FIG. 8 illustrates the transmission rates of each of five packet sending devices when the transmission rate control method according to an exemplary embodiment of the present invention is not applied.

When packets are sent from five packet sending devices in the conventional art, as illustrated in FIG. 8, the packet transmission rates 520, 530, 540 and 550 of the second to fifth packet sending devices are conspicuously lower than the packet transmission rate 510 of the first packet sending device (according to the conventional art).

Figure 9:
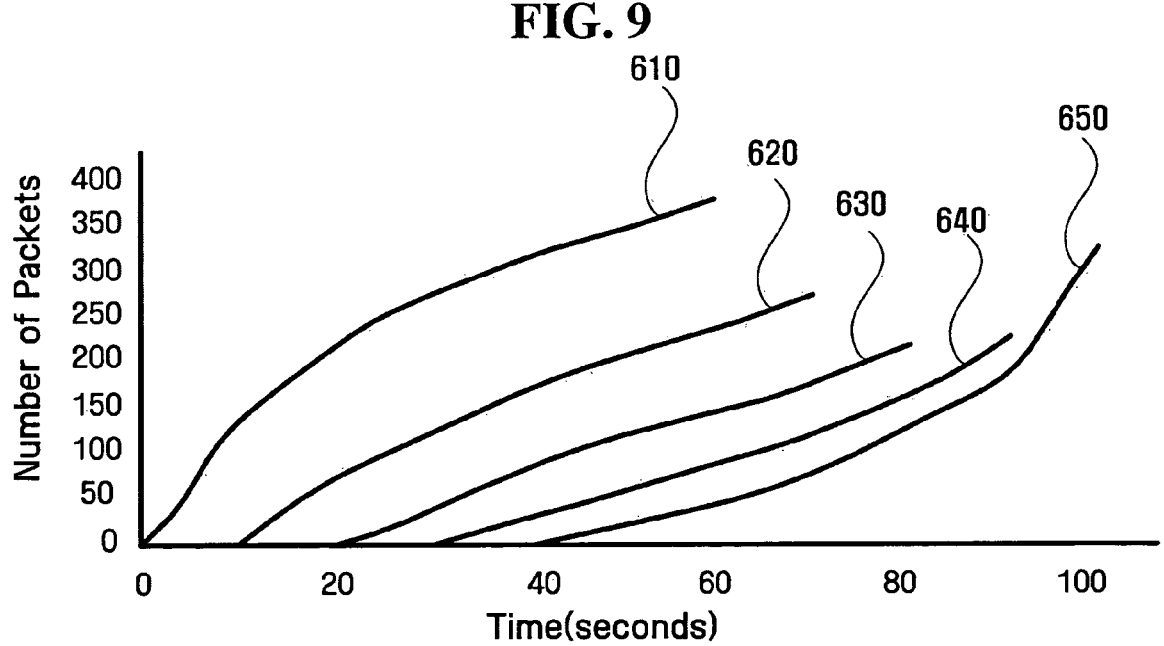
FIG. 9 illustrates the transmission rates of each of five packet sending devices when the transmission rate control method according to an exemplary embodiment of the present invention is applied.

However, as illustrated in FIG. 9, when the exemplary embodiment of the present invention is used, the packet transmission rate of the first packet sending device 610 and the transmission rates of the second to fifth packet sending devices 620, 630, 640 and 650 are as a whole stable.

As described above, a wireless network apparatus and a method for controlling the transmission rate being used by the same according to the present invention produces one or more of the following effects.

First, since the receiver side can coordinate the number of packets sent from the sender side, over-flow of the middle node buffer can be prevented.

Second, equal transmission rates can be secured when there is a plurality of senders.

Those of ordinary skill in the art can understand that various replacements, modifications and changes in form and details may be made therein without departing from the spirit and scope of the present invention as defined by the following claims. Therefore, it is to be appreciated that the above described exemplary embodiments are for purposes of illustration only and not to be construed as a limitation of the invention.

What is claimed is:

1. A wireless network apparatus comprising:
   a time interval calculation unit to calculate current time intervals of received packets;
   a receiving mode determining unit to determine a receiving mode to receive packets according to the current time intervals;
   a period calculating unit to calculate a period during which the determined receiving mode is maintained, based on the time intervals; and
   a maximum packet determining unit to determine the maximum number of packets which can be sent to a network by a device, according to the number of packets consecutively received during the calculated period,
   wherein the period calculating unit calculates the period based on an average time interval and an average difference value between average time intervals, and
   wherein the average time interval is obtained from a combination of a previous average time interval and a current time interval, and
   wherein the average difference value between average time intervals is obtained from a combination of the average time interval and a previous average difference value.

2. A wireless network apparatus comprising:
   a time interval calculation unit to calculate current time intervals of received packets;
   a receiving mode determining unit to determine a receiving mode to receive packets according to the current time intervals;
   a period calculating unit to calculate a period during which the determined receiving mode is maintained, based on the time intervals; and
   a maximum packet determining unit to determine the maximum number of packets which can be sent to a network by a device, according to the number of packets consecutively received during the calculated period,
   wherein the period calculating unit calculates the period based on an average time interval and an average difference value between average time intervals, and
   wherein the average time interval is obtained using the equation: $T_A = a*T_o + b*T_N$, where $T_A$ refers to the average time interval, $T_o$ refers to a previous average time interval, and $T_N$ refers to a current time interval, and "a" is a weight assigned to the previous average time interval and "b" is a weight assigned to the current time interval used in obtaining the average time interval, and wherein the average difference value between average time intervals is obtained from a combination of the average time interval and a previous average difference value.

3. The wireless network apparatus of claim 2, wherein the average difference value between average time intervals is obtained using the equation: $V_N = c*V_o + d*T_A$, where $V_N$ refers to an average difference value between average time intervals, $V_o$ refers to a previous average difference value, "c" is a weight assigned to the previous average time interval and "d" is a weight assigned to the current time interval used in obtaining the difference value.

4. The wireless network apparatus of claim 3, wherein the period is obtained using the equation: $T_M = [0, T_A + V_N]$, where $T_M$ refers to the period during which the determined receiving mode is maintained.

5. A wireless network apparatus comprising:
   a packet sending unit to send packets;
   a response packet receiving unit to receive a response packet from a device that receives the sent packets; and
   a packet determining unit to determine the number of packets to be sent, according to the maximum number of packets included in the response packet,
   wherein the device that receives the sent packets determines the maximum number of packets according to the number of packets consecutively received for a period during which a receiving mode is maintained, and the receiving mode is determined according to time intervals between packets reception, the period being calculated based on the time intervals and
   wherein the period to maintain the determined receiving mode is calculated based on an average time interval and an average difference value between average time intervals, and
   wherein the average time interval is obtained from a combination of a previous average time interval and a current time interval, and
   wherein the average difference value between average time intervals is obtained from a combination of the average time interval and a previous average difference value.

6. A wireless network apparatus comprising:
   a packet sending unit to send packets;
   a response packet receiving unit to receive a response packet from a device that receives the sent packets; and
   a packet determining unit to determine the number of packets to be sent, according to the maximum number of packets included in the response packet,
   wherein the device that receives the sent packets determines the maximum number of packets according to the number of packets consecutively received for a period during which a receiving mode is maintained, and the receiving mode is determined according to time intervals between packets reception, the period being calculated based on the time intervals and
   wherein the period to maintain the determined receiving mode is calculated based on an average time interval and an average difference value between average time intervals, and
   wherein the average time interval is obtained using the equation: $T_A = a*T_O + b*T_N$,
   where $T_A$ refers to the average time interval, $T_O$ refers to a previous average time interval, and $T_N$ refers to a current time interval, "a" is a weight assigned to the previous average time interval and "b" is a weight assigned to the current time interval, and wherein the average difference value between average time intervals is obtained from a combination of the average time interval and a previous average difference value.

7. The wireless network apparatus of claim 6, wherein the average difference value between the average time intervals is obtained using the equation: $V_N, = c*V_O d*T_A$, where $V_N$ refers to an average difference value between average time intervals, $V_O$ refers to a previous average difference value, "c" is a weight assigned to the previous average time interval and "d" is a weight assigned to the current time interval.

8. The wireless network apparatus of claim 7, wherein the period is obtained using the equation: $T_M = [0, T_A + V_N]$, where $T_M$ refers to a period during which the determined receiving mode is maintained.

9. The wireless network apparatus of claim 7, wherein the packet determining unit sends packets as many packets as the difference between the maximum number of packets included in the response packet and the total number of packets sent to the network.

10. A method for controlling a transmission rate of a wireless network apparatus, comprising:
 calculating current time intervals of received packets;
 determining a receiving mode to receive packets according to the current time intervals;
 calculating a period during which the determined receiving mode is maintained, based on the time intervals; and
 determining the maximum number of packets that can be sent to a network by a device, according to the number of packets consecutively received during the calculated period,
 wherein the period is calculated based on an average time interval and an average difference value between average time intervals, and
 wherein the average time interval is obtained from a combination of a previous average time interval and a current time interval, and
 wherein the average difference value between average time intervals is obtained from a combination of the average time interval and a previous average difference value.

11. A method for controlling a transmission rate of a wireless network apparatus, comprising:
 calculating current time intervals of received packets;
 determining a receiving mode to receive packets according to the current time intervals;
 calculating a period during which the determined receiving mode is maintained, based on the time intervals; and
 determining the maximum number of packets that can be sent to the network by a device, according to the number of packets consecutively received during the calculated period,
 wherein the period is calculated based on an average time interval and an average difference value between average time intervals, and
 wherein the average time interval is obtained using the equation: $T_A = a*T_O + b*T_N$,
 where $T_A$ refers to the average time interval, $T_O$ refers to a previous average time interval, $T_N$ refers to a current time interval, "a" is a weight assigned to the previous average time interval and "b" is a weight assigned to the current time interval, and wherein the average difference value between average time intervals is obtained from a combination of the average time interval and a previous average difference value.

12. The method of claim 11, wherein the average difference value between average time intervals is obtained using the equation: $V_N = c*V_O\ d*T_A$, where $V_N$ refers to an average difference value between average time intervals, Vo refers to a previous average difference value, "c" is a weight assigned to the previous average time interval and "d" is a weight assigned to the current time interval.

13. A method for controlling a transmission rate of a wireless network apparatus, comprising:
 calculating current time intervals of received packets;
 determining a receiving mode to receive packets according to the current time intervals;
 calculating a period during which the determined receiving mode is maintained, based on the time intervals; and
 determining the maximum number of packets that can be sent to a network by a device, according to the number of packets consecutively received during the calculated period,
 wherein the period is obtained using the equation: $T_M = [0, T_A + V_N]$, where $T_M$ refers to a period during which the determined receiving mode is maintained, $T_A$ refers to an average time interval, and $V_N$ refers to an average difference value between average time intervals, and wherein the average time interval is obtained from a combination of a previous average time interval and a current time interval, and
 wherein the average difference value between average time intervals is obtained from a combination of the average time interval and a previous average difference value.

14. A method for controlling a transmission rate of a wireless network apparatus, comprising:
 sending packets;
 receiving a response packet from a device which receives the sent packets; and
 determining the number of packets to be sent, according to the maximum number of packets included in the response packet,
 wherein the device which receives the packets determines the maximum number of packets according to the number of packets consecutively received during a period where a receiving mode is maintained, and the receiving mode is determined according to time intervals between packets reception, the period being calculated based on the time intervals and
 wherein the period to maintain the determined receiving mode is calculated based on an average time interval and an average difference value between average time intervals, and
 wherein the average time interval is obtained from a combination of a previous average time interval and a current time interval, and
 wherein the average difference value between average time intervals is obtained from a combination of the average time interval and a previous average difference value.

15. A method for controlling a transmission rate of a wireless network apparatus, comprising:
 sending packets;
 receiving a response packet from a device which receives the sent packets; and
 determining the number of packets to be sent, according to the maximum number of packets included in the response packet,
 wherein the device which receives the packets determines the maximum number of packets according to the number of packets consecutively received during a period where a receiving mode is maintained, and the receiving mode is determined according to time intervals between packets reception, the period being calculated based on the time intervals and
 wherein the period to maintain the determined receiving mode is calculated based on an average time interval and an average difference value between average time intervals, and
 wherein the average time interval is obtained using the equation: $T_A = a*T_O + b*T_N$,
 where $T_A$ refers to the average time interval, $T_O$ refers to a previous average time interval, $T_N$ refers to a current time interval, "a" is a weight assigned to the previous average time interval and "b" is a weight assigned to the current time interval, and wherein the average difference value between average time intervals is obtained from a combination of the average time interval and a previous average difference value.

16. The method of claim 15, wherein the average difference value between average time intervals is obtained using the equation: $V_N = c*V_O d*T_A$, where $V_N$ refers to an average difference value between average time intervals, Vo refers to a previous average difference value, "c" is a weight assigned to the previous average time interval and "d" is a weight assigned to the current time interval.

17. The method of claim 16, wherein the period is obtained using the equation: $T_M=[0, T_A+V_N]$, where $T_M$ refers to a period during which the determined receiving mode is maintained.

18. The method of claim 17, wherein determining the number of packets to be sent involves sending as many packets as the difference between the maximum number of packets included in the response packet and the total number of packets sent to the network.

* * * * *